Figure 1:
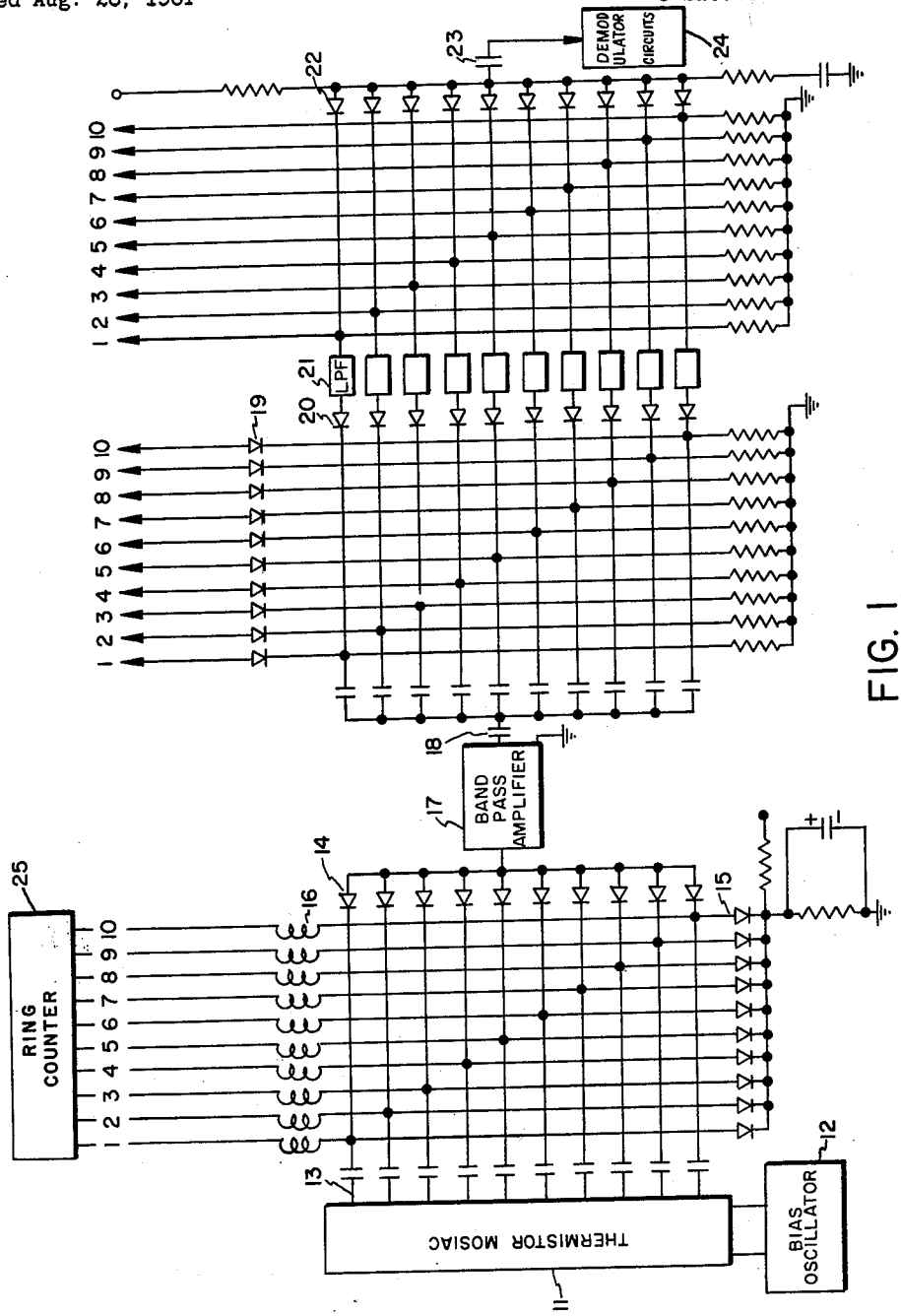

Oct. 20, 1964   G. JANKOWITZ   3,153,761
LOW NOISE MULTIPLE SWITCHING SYSTEMS
Filed Aug. 28, 1961   3 Sheets-Sheet 2

INVENTOR.
GERALD JANKOWITZ
BY
ATTORNEY

3,153,761
LOW NOISE MULTIPLE SWITCHING SYSTEMS
Gerald Jankowitz, Lewisboro, N.Y., assignor to Barnes Engineering Company, Stamford, Conn., a corporation of Delaware
Filed Aug. 28, 1961, Ser. No. 134,372
8 Claims. (Cl. 325—364)

This invention relates to bolometers using A.C. bias detectors and in a more specific embodiment to switched multiple bolometers.

Ordinary bolometers such as thermistor bolometers are usually composed of two thermistor flakes in series with the bias current flowing through them. One flake is usually exposed to radiation and the other shielded thus constituting a reference flake which reduces the effect of changes in ambient temperature. Thermistor bolometers are normally D.C. biased. This permits a simple method of eliminating errors due to changes in ambient temperature and in thermistor response. The radiation is either chopped or some scanning mechanism is used so that the desired signal is A.C. Conventional A.C. amplifiers and processing circuits therefor do not respond to D.C. and hence to bolometer drift.

When it is attempted to use A.C. bias on the detectors the elimination of drift and other slowly changing signals is no longer effective because the A.C. amplifiers pass the bias frequency as well as signal frequencies. This is one of the reasons why A.C. bias has not been used extensively in bolometers.

When applied to single bolometers the broad advantage of the present invention is obtained by utilizing an A.C. bias of sufficiently high frequency so that after amplification the resulting signal can be demodulated and further amplified at a lower frequency corresponding to signal frequency. This demodulation eliminates the bias frequency signal as such and with it slow changes such as drift and the like. The same advantages which are available with D.C. bias are obtained with A.C. bias and so a new field is open for A.C. biased detectors.

A more specific embodiment of the present invention involves multiple bolometers and permits sequential switching which was hitherto a serious problem or in some cases impractical.

For a number of uses multiple bolometers and particularly multiple thermistor bolometers have become important. For example, if it is necessary to obtain separate data from a large number of thermistor bolometers it is, of course, possible to provide separate amplifying systems for each bolometer. But when there are a large number of bolometers, which may run as high as 100 or 1,000, the weight and cost of separate amplifiers can become prohibitive. Space is also often of importance where common optics are used for all of the bolometers. Very compact mosaics of thermistors are described in the patent to H. Miserocchi, No. 2,986,717, dated May 30, 1961. This has made possible collecting optics and a large number of bolometers in a very compact package which makes the saving in weight and size of electronic processing circuits relatively even more important. It is with the solution of this problem that the present invention specifically deals. It will be described in connection with thermistor bolometers it being understood that any other biased detectors of electromagnetic radiation may be used in which active elements change their conductivity. Except for their biasing requirements as to voltage and current the present invention is not affected significantly by the nature of the radiation detectors. Also, since the present invention utilizes conventional optics and does not change the organization of collecting optics and thermistor bolometers they will not be shown.

In order to cut down on the weight and space of processing circuits it would be desirable to sample sequentially the signal output from each bolometer which would permit the use of a single amplifier and single processing circuits beyond the amplifier. When, however, it is attempted to switch sequentially from one bolometer to another a very serious problem arises. Bolometers and some other radiation detectors often have to operate at extreme sensitivities. Radiation energy is often of the order of fractions of a microwatt. As a result the systems reach a limit set by thermal noise. Thermistor bolometers as such can be made with very low noise figures often approaching the theoretical limit of Johnson noise. Therefore, any noise introduced by switching can seriously limit the sensitivity of the instruments. Unfortunately, so far, there is no such thing as a noiseless switching mechanism, whether it is a high speed mechanical switch or electronic switches such as diodes, transistors and the like.

Proposals have been made to amplify the output from each bolometer in separate preamplifiers to a level such that the noise contributed by switching becomes negligible as far as the overall sensitivity of the instrument is concerned. Separate preamplifiers are, of course, lighter and smaller than separate amplifiers and complete processing circuits but they still represent excessive weight and space when instruments are used with a very large number of thermistor bolometers. This make switching directly at the bolometer output very attractive since switches of extremely small size, such as diodes, are available. However, as pointed out above it has hitherto been impractical to design instruments which switch at the bolometer output because switch noise becomes so high that it masks weak signals.

The more specific aspect of the present invention solves the problem of switching at the output of the bolometers in a very simple and reliable manner without significant degration of bolometer sensitivity. Essentially the present invention employs a high frequency A.C. bias for the bolometers. The frequency should be much higher than the switching frequency as will be developed quantitatively below. For many instruments the frequency will be in the hundreds of thousands of kilocycles or even about a megacycle. The bolometer outputs are sequentially switched at a more moderate frequency which in typical instruments may vary from as low as a few hundred c.p.s. to 10 kc. or more.

The present invention is not limited to any particular switching means. High speed mechanical switches may be used but, because of the possibility of very compact circuitry, electronic switches such as diode gates present practical operating advantages. This method of switching is preferred but essentially in its broadest aspects the invention is not concerned at all with the nature of the switches.

Let us assume a switching rate of 10 kc. with an A.C. bias frequency of 456 kc. As each bolometer is switched to the amplifier and processing circuits the signal contains the A.C. bias and successive side bands at harmonics of the switching frequency and containing switch noise, signal and, in a normal instrument where the radiation is chopped, also the chopping frequency. In order to get clear signals eventually and eliminate cross talk from one bolometer to another it is desirable for the amplifier to pass a number of side bands, for example, three on each side of the A.C. bias frequency. However, the side bands near the A.C. carrier frequency, although they carry the desired signal effectively, carry very little of the switch noise which is centered about the switching frequency. Thus, although the noise in the switches may be many times as great as the signal power the amplifier can be designed to discriminate many orders of magnitude against the noise frequency. More quantitative figures will be given below but it is sufficient here to indicate that if the bias frequency is substantially more than ten times the switching frequency there will be a very heavy attenuation of the switch noise, in representative cases more than 1,000 to one. When the A.C. bias frequency is thirty, or more times the switching frequency the switching noise is attenuated to a point where it is comparable in magnitude to the inherent Johnson noise of the bolometer. In other words, the system approaches theoretical maximum sensitivity.

It is necessary usually to effect more processing of the signal from each bolometer thus, for example, it is ordinarily necessary to demodulate or decommutate to eliminate the effect of switching and it is often also necessary to provide other circuits which, for example, will present each bolometer signal on a separate line on a cathode ray tube thus producing a raster type of readout. Other circuits may be used to process the individual information for other purposes. The present invention is not concerned with the nature of these further processing circuits and so there will be described only circuits producing the signal which goes to the final demodulators or processing circuits. Once the switch noise has been eliminated or drastically reduced and clean successive signals from the bolometers obtained the present invention ceases, for it is not concerned with what is done with the clean signals obtained.

It will be noted that when the present invention is applied to multiple bolometers the A.C. bias frequency is determined to a large extent by the frequency at which the multiple bolometers are switched or commutated. When the present invention is applied to a single bolometer a much less restricted choice of bias frequencies is possible. In fact so long as the frequency is sufficiently removed from signal frequency so that it can be eliminated in practical amplifying and demodulating circuits it does not make much difference how high it is. This wide choice makes possible a further simplification where the signal from the bolometer is to be telemetered over a radio frequency channel. In such a case the telemetering transmitter oscillator may also provide the A.C. bias frequency which saves parts as no separate bias frequency generator becomes necessary.

Figure 2:
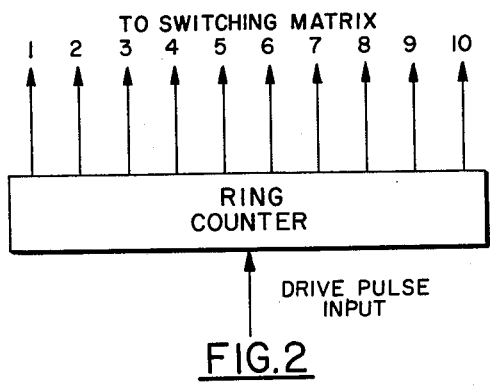
Figure 3:
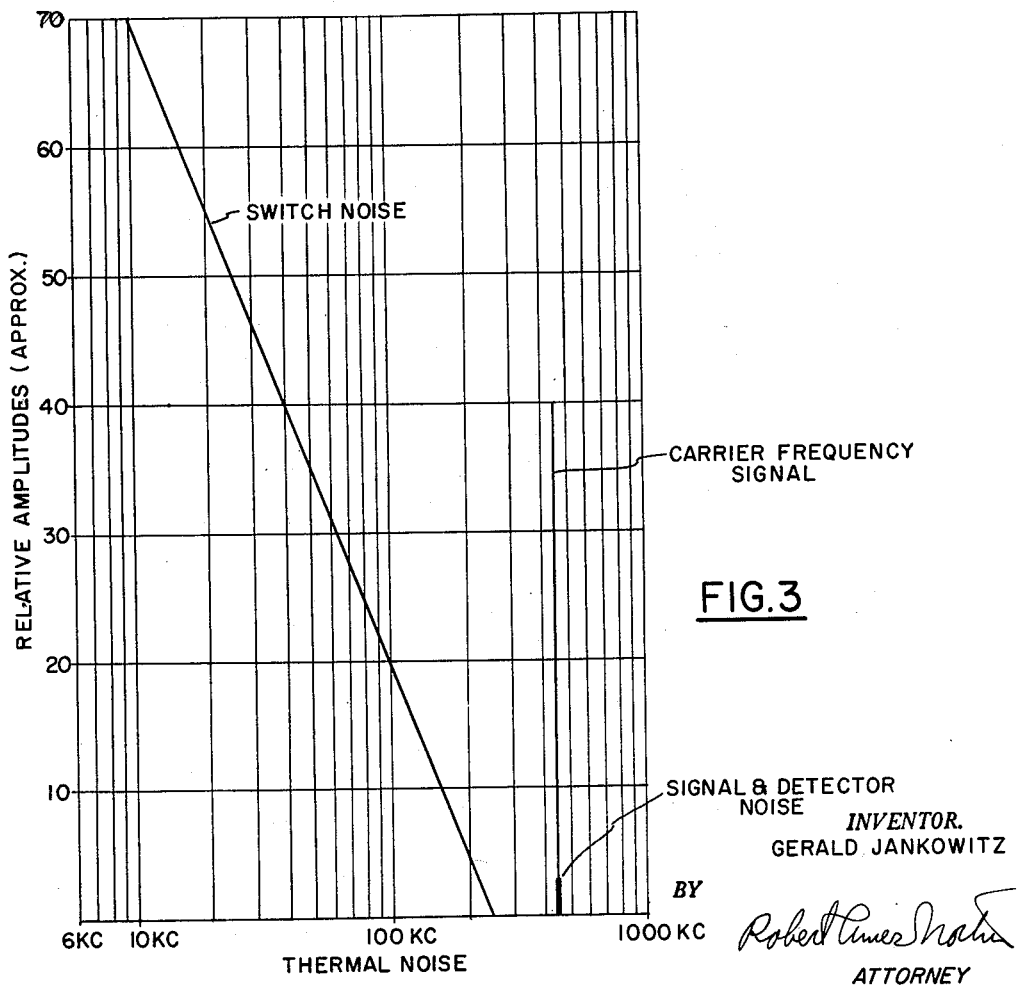
Figure 4:
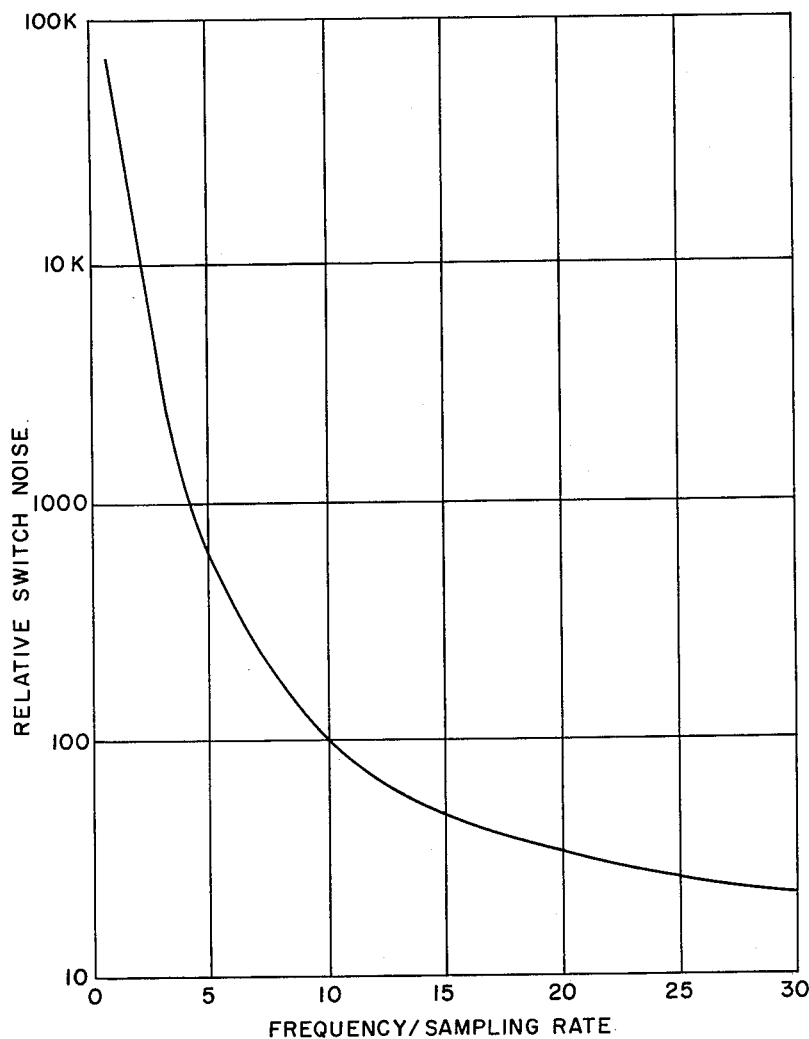

The invention will be described in connection with a thermistor bolometer mosaic of only ten elements and gated electronic switching will be illustrated. An instrument with only ten detectors does not present a particularly attractive field for the present invention which becomes more and more important as the number of detector elements increases. However, the small number of elements is used in the description in order to eliminate unnecessary complexity in the drawings in which:

FIG. 1 is a block diagram schematic;
FIG. 2 is a block diagram of a gating signal generator;
FIG. 3 is a graph of noise and signals, and
FIG. 4 is a graph of typical measurements of the effect of the ratio of biasing frequency to switch frequency.

Turning to FIG. 1 a thermistor bolometer mosaic 11 is fed by a bias oscillator 12 operating, for example, at 456 kc. The outputs of the thermistor bolometers pass through small capacitors 13 into gated circuits each composed of a diode 14 and a diode 15. Gating signals from a ring counter, which will be described below, come in over lines 1 to 10. Each signal is isolated from the diode gates by an RF choke 16. As signals are received and the gates successively open the output of each bolometer in turn is passed to a bandpass amplifier 17. With the frequency values given above this bandpass amplifier is a standard stagger tuned amplifier which passes a band from about 420 kc. to 490 kc. This permits enough side bands of harmonics of the switching frequency to give clear signals without cross talk. The output of the amplifier, after passing through a large capacitor 18, is then connected to the input of another series of gates which again are formed of diodes 19 and 20. Gating signals from the ring counter 25 come in over the lines 1 to 10 and when the gate for one bolometer is opened to the amplifier 17 the corresponding gate in the output is also opened. The output then passes through low pass filters and again there are a series of gates using only single diodes 22 which are also actuated by gating signals coming in over the lines 1 to 10. Finally the output passes through a capacitor 23 to demodulators or other processing circuits 24 of standard design with the details of which the present invention is not concerned.

FIG. 2 is a block diagram of a conventional ring counter with 10 output channels. Typical ring counter circuits are shown on page 343 of the book, "Pulse and Digital Circuits," by Millman & Taub. The ring counter is fed by a suitable pulse train at the switching frequency desired. The counter successively actuates output circuits. These are labelled 1 to 10 and correspond to the similarly numbered lines on FIG. 1.

The nature of the generators of switching pulses can vary widely so long as they do not introduce excessive noise close enough to the A.C. bias frequency so that it passes through the amplifier. Ring counters are only one form of electronic device which produce successive signals without excessive high frequency noise. Such a switching mechanism is described as it is a very simple and economical system but the present invention is in no sense limited thereto. Any other circuits which will produce successive gating signals will operate the instrument in the same manner. Putting it another way the diodes which effect the switching are not concerned with the past history of the gating signals they receive. Nevertheless there are real advantages in using ring counters and this form is, therefore, a preferred one. When there are a large number of bolometers switching can be effected with only a small number of counters. For example, two counters can handle 100 bolometers, three counters 1,000, etc.

FIG. 3 is on semilog paper and the attenuation shows up signals. It will be noticed that the switch noise is concentrated about the switching or commutation frequency. FIG. 3 is a semilog paper and the attenuation shows up as a straight line. It will be seen that long before the low frequency response end of the amplifier is reached the switch noise has been attenuated to a negligible figure.

When the ratio of frequency of A.C. bias to switching or commutating rate is somewhat lower a little switch noise comes through. FIG. 4 shows attenuation and the values are relative. It will be seen that as the ratio increases up to 10 times there is a very steep drop in the relative noise curve. It begins to flatten out rapidly beyond a ratio of 10 and at a ratio of 30 it has approached a negligible figure. It should be noticed that there is still some noise, in other words the curve does not approach the zero line but this is not switch noise for the curve includes all of the noise in the system.

Since in a specific modification the present invention is concerned with the elimination or drastic reduction of switch noise it is not directly concerned with the other factors in total noise. Of course, no system can ever go below the Johnson noise of the radiation detectors.

Another advantage of the present invention is that the problem of low frequency noise in amplifiers is eliminated or greatly reduced. This is particularly serious in transistorized amplifiers and so the present invention permits the use of simpler amplifiers though, of course, they should be of high quality and low noise.

I claim:
1. A low noise switching system for multiple sensors, the active portion of each sensor comprising an element which changes its conductivity under electromagnetic radiation comprising, in combination,
   (a) means for biasing the sensors at a high A.C. frequency,
   (b) switching means in the output of each sensor,

(c) means for actuating the switching means at a frequency not more than one-tenth that of the A.C. bias frequency, and (d) bandpass amplifying means the bandpass of which is centered around A.C. bias frequency and is sufficiently narrow so that amplification of signals at switching frequency is negligible and means for connecting the outputs of the switches successively to the input of said amplifying means.

2. A switching system according to claim 1 in which the sensors are bolometers the active portion of which comprises an element which changes its conductivity with temperature.

3. A system according to claim 2 in which the bolometer is a thermistor bolometer.

4. A system according to claim 2 in which the sensors are thermistor bolometers.

5. A system according to claim 4 in which the ratio of frequency of A.C. bias to switching frequency is at least 30.

6. A system according to claim 2 in which the ratio of frequency of A.C. bias to switching frequency is at least 30.

7. A system according to claim 2 in which the switching means comprise electronic gating means in the output of each sensor and means for successively applying a gating signal to the gates.

8. A system according to claim 7 in which the gating means are diode gating means.

References Cited in the file of this patent

UNITED STATES PATENTS

| | | |
|---|---|---|
| 2,442,298 | Liston | May 25, 1948 |
| 2,980,861 | Popowsky | Apr. 18, 1961 |